(No Model.)
J. F. GUBBINS.
DRYING APPARATUS.
No. 257,159. Patented May 2, 1882.
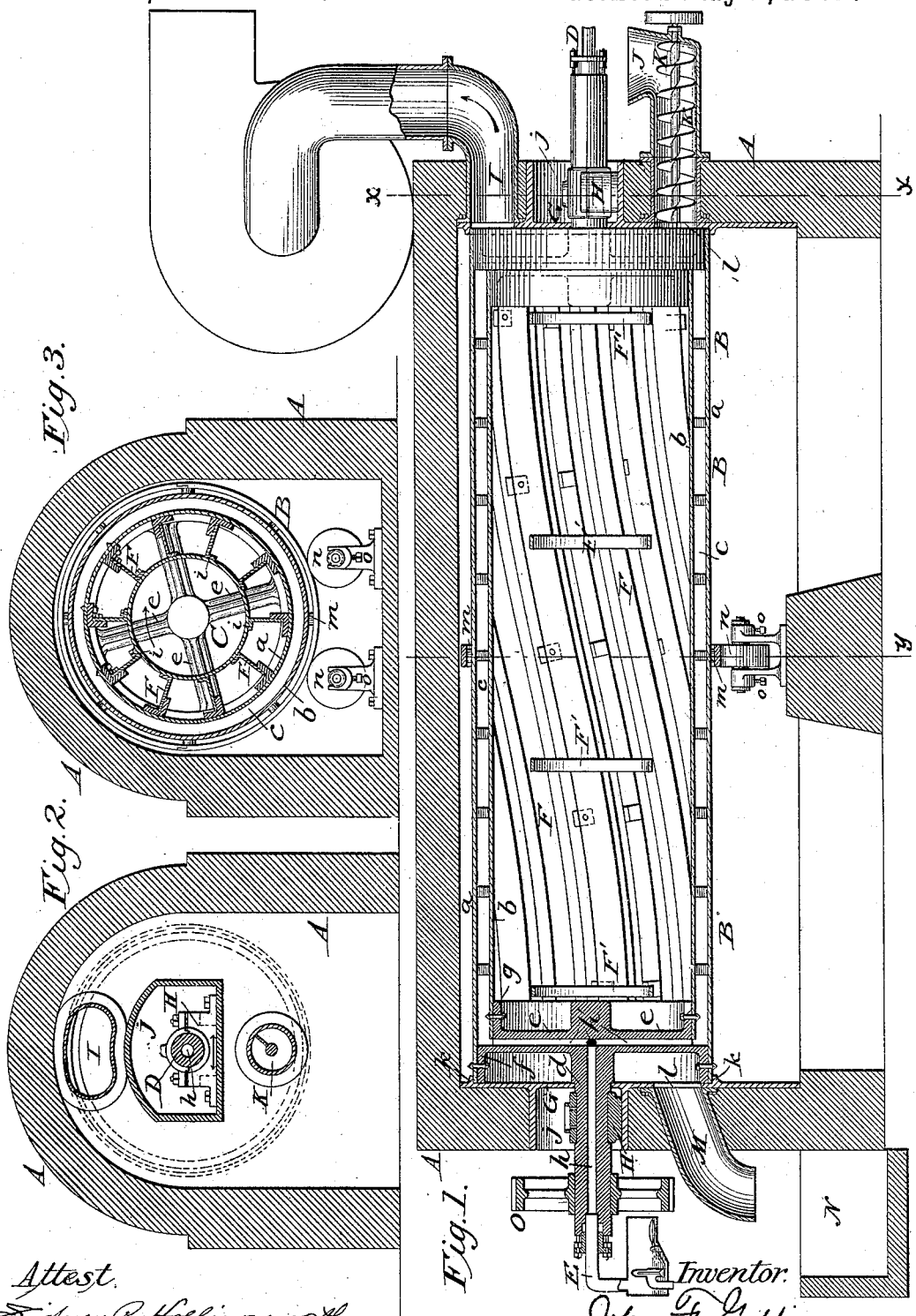
Attest.
Sidney P. Hollingsworth
Walter F. Dodge
Inventor.
John F. Gubbins
by Dodge Son,
Attys.
N. PETERS. Photo-Lithographer, Washington, D. C.

UNITED STATES PATENT OFFICE.

JOHN F. GUBBINS, OF CHICAGO, ILLINOIS.

DRYING APPARATUS.

SPECIFICATION forming part of Letters Patent No. 257,159, dated May 2, 1882.

Application filed February 17, 1882. (No model.)

*To all whom it may concern:*

Be it known that I, JOHN F. GUBBINS, of Chicago, in the county of Cook and State of Illinois, have invented certain Improvements in Drying Apparatus, of which the following is a specification.

My invention relates to apparatus for drying grain, malt, meal, flour, and other substances or materials; and it consists in various features and details of construction hereinafter set forth.

The apparatus consists essentially of a steam-jacketed rotary cylinder having fixed head-plates of peculiar construction, hollow steam-carrying gudgeons or journals and spokes for admitting and exhausting steam to and from the steam-space, laterally-adjustable boxes or bearings for the gudgeons, spiral radial shelves extending from the inner walls inward, and formed with flanged or upturned inner edges, and an outside encircling band or hoop traveling upon adjustable supporting-rollers, for the purpose of sustaining the cylinder between its ends and preventing sagging or binding of the gudgeons.

In the accompanying drawings, Figure 1 represents a longitudinal vertical section through my improved apparatus; Fig. 2, a vertical transverse section on the line $x\, x$, and Fig. 3 a similar section on the line $y\, y$ of Fig. 1.

Drying apparatus or machinery has hitherto been constructed in a variety of forms, and in many respects similar to that which I am about to describe. By my peculiar construction and arrangement of the parts, however, I produce a machine which I believe to be more efficient than others heretofore known.

In the drawings, A represents a chamber, built of brick or masonry, within which is arranged a horizontal cylinder, B, composed of an outer shell, $a$, and an inner shell, $b$, between which is left a steam-space, $c$, to receive the steam by which the cylinder is heated. The ends of the cylinder are carried by spider-heads C, each consisting of a central hub or boss extended outward to form a short shaft or gudgeon, $d$, a series of radial arms, $e$, projecting from the hub or shaft, and an annular rim having two ledges or flanges, $f\, g$, of different diameters, to correspond with the diameters of the two shells $a$ and $b$, which are riveted or bolted thereto, as shown in Figs. 1 and 2. The shafts or gudgeons $d$ are each cast or formed with a central passage or opening, $h$, communicating with similar passages, $h'$, extending through the arms $e$ and opening at the extremities thereof into the steam-space $c$, as shown. These passages in the respective spider-heads serve for the admission of steam to the space $c$ and its exhaust therefrom, steam-pipes D and E being connected with the ends of the gudgeons or shafts and made tight by packing-glands, as shown, in order to permit the free rotation of the cylinder without allowing the steam to escape at the connection. The interior of the cylinder is furnished with a number of longitudinal spiral shelves, F, of considerable width, which stand in radial planes and extend inward from the inner wall of the cylinder or shell $b$, as shown. The inner edges of the shelves are formed with an upturned edge or flange, $i$, which serves to prevent the material carried up by the shelves from falling off therefrom in a mass or body, but causes it to be carried to a higher point than could be done by plane shelves, and to be discharged gradually in a thin, even stream from the upper to the lower side of the cylinder. This feature is one of great importance, since it more effectually separates and exposes the different particles of material and permits the heat to act upon the same to far greater advantage than where the shelves merely raise it a short distance and then discharge it in a body, as is the case under ordinary constructions.

For the purpose of retaining the shelves in proper relative position and preventing them from becoming bent or twisted—a difficulty likely to be encountered where wide shelves are employed—I connect the inner edges of the shelves by circular bands or rings F', as shown, so that all the shelves are caused to support one another.

The ends of the cylinder are closed, with the exception of the necessary inlet and outlet openings, by stationary heads or wall-plates G, in which latter said openings are formed. The construction of these wall-plates will be understood by referring to Figs. 1 and 2, where they will be seen to consist of straight flat plates having a central opening for the passage of the shafts or gudgeons $d$ through them, a tunnel-like projection or neck, $j$, on the outer side, to receive the bearing-boxes H, and a flange, $k$, on the inner face, concentric with the shaft or gudgeon $d$, and of proper diameter to fit closely over the end of the cylinder B, as shown. The projecting neck $j$ serves also to assist in retaining the plate or head in position, being built into the masonry, as shown. Both heads or end plates are formed with an opening, $l$, opposite the lower side of the cylinder—one for the supply and the other for the discharge of the material—and the head at the feeding or receiving end is furnished with a large outlet-pipe, I, directly above the feed-opening, as shown, its purpose being to rapidly carry off the moisture, which is of course greatest at that end—first, because the material fed in loses its moisture as it approaches the discharge end, and, secondly, because a strong current of air passes through the machine from the discharge-outlet to the vapor-spout I, being drawn through the same by a fan applied to said spout. It is therefore important to provide a large and free outlet at this point.

The bearings or boxes H, as before stated, are located in the arched necks $j$, which are formed with a horizontal lower side, and of such width that the boxes may be adjusted laterally for alignment with the shafts or gudgeons, which latter, being centered by passing through the openings in the heads or wall-plates, serve to guide the builder in adjusting the boxes.

For the purpose of rendering the machine essentially automatic in its operation, I provide a supply-hopper, J, and connect the same by a pipe or spout with the feed-opening $l$, within which I arrange a spiral conveyer, K, of slow pitch. The conveyer-shaft is furnished with a band-wheel, to which motion is imparted from any convenient source, thus causing the conveyer to supply material to the cylinder in a steady and even stream, the spiral form or inclined position of the shelves serving to cause the material to travel toward the discharge end, where it passes out through a spout, M, and falls into a pit or receptacle, N.

In order to prevent the sagging of the cylinder at a point between its ends, which is liable to occur when it is of considerable length, an encircling-band is carried about the cylinder and secured thereto by intervening blocks or stays, $m$, which, with the band, serve in a measure to truss and stiffen the cylinder, and beneath this band I arrange anti-friction rollers $n$, one or more, which receive a portion of the weight of the cylinder. The rollers are made vertically adjustable by means of set-screws $o$, wedges, or equivalent devices, to compensate for wear, and are supported by substantial foundations, as shown.

Motion is imparted to the cylinder by a band-wheel or gear, O, secured upon one of the gudgeons or shafts, $d$, and in turn receiving motion from any convenient source.

A steam-trap will usually be provided for the exhaust-steam pipe to prevent the waste of steam, and curved buckets or guards may be provided to gather the water of condensation and insure the discharge through the radial arms and shaft.

I am aware that steam has been introduced through a central shaft and carried through the spokes of a drying-cylinder, and that inclined or spiral radial shelves have before been used in drying machinery.

I am likewise aware that a drying-cylinder sustained at its ends has been furnished at an intermediate point with a threaded or toothed encircling band for the purpose of receiving motion from a worm-wheel meshing therewith, and these features I do not broadly claim.

I am aware that adjustable rollers have been arranged beneath the end of a drying-cylinder to sustain the same and permit a variation of its inclination; but I am not aware that a cylinder having its ends carried in fixed supports has ever before been sustained at an intermediate point by adjustable rollers, whereby compensation for wear could be made.

Having thus described my invention, what I claim is—

1. A wall-plate for drying machinery substantially such as described, consisting of the plate G, having a central opening for the passage of the cylinder-shaft, a flange, $k$, concentric with said opening, and a neck, $j$, having a horizontal lower side to receive the bearing or box H, and adapted to be built into the wall of the apparatus, as set forth.

2. A drying-cylinder provided with radial longitudinal shelves, secured at their outer edges to the cylinder and connected at their inner edges by hoops or bands, as shown.

3. The spider-head C for a drying-cylinder, having the hollow shaft $d$ and spokes $e$, and the double rim $f\ g$, whereby it is adapted to receive and be attached to the inner and outer casings of the cylinder, as set forth.

4. In combination with the cylinder B, supported at its ends, rollers $n$, located beneath the cylinder at a point between the end supports, and provided with means for adjusting them vertically, substantially as described, whereby the rollers are adapted to be set up to compensate for wear and to prevent sagging of the cylinder.

5. A drying apparatus consisting of a steam-jacketed rotary cylinder, B, having the spider-heads C, constructed with steam-passage, as explained, spiral blades or shelves F, heads or wall-plates G, hopper J, conveyer K, discharge-spout M, vapor-spout I, and an exhaust-fan connected with said spout, all arranged and operating substantially as explained.

6. In combination with the wall-plates or heads, having central openings for the shaft or gudgeon $d$ and the neck $j$, the adjustable boxes H, substantially as shown and described.

JOHN F. GUBBINS.

Witnesses:
W. C. MINARD,
WM. H. SKELLY.